United States Patent [19]

Rodal

[11] Patent Number: 4,877,472
[45] Date of Patent: Oct. 31, 1989

[54] METHOD OF MAKING A BEARING BLANKET

[75] Inventor: José J. A. Rodal, Clarks Summit, Pa.

[73] Assignee: Beloit Corporation, Beloit, Wis.

[21] Appl. No.: 265,080

[22] Filed: Oct. 31, 1988

[51] Int. Cl.$^4$ .................. B37B 31/00; D21F 3/02
[52] U.S. Cl. .................. 156/184; 29/123; 156/193; 156/194; 156/211; 156/268; 156/289; 162/358
[58] Field of Search ............ 156/184, 193, 194, 195, 156/250, 211, 268, 289; 162/358, 361; 29/123, 131, 132

[56] References Cited

U.S. PATENT DOCUMENTS

| | | | |
|---|---|---|---|
| 4,055,879 | 11/1977 | Schneider et al. | 29/123 |
| 4,229,253 | 10/1980 | Cronin | 162/361 X |
| 4,238,287 | 12/1980 | Gill | 162/358 |
| 4,330,023 | 5/1982 | Cronin | 162/358 |
| 4,552,620 | 11/1985 | Adams | 162/358 |
| 4,673,461 | 6/1987 | Roerig et al. | 162/358 X |

Primary Examiner—David Simmons
Attorney, Agent, or Firm—Dirk J. Veneman; Raymond W. Campbell; David J. Archer

[57] ABSTRACT

A method of making a bearing blanket for an extended nip press is disclosed. The method includes the steps of wrapping a reinforcing mat with uncured elastomeric polymer around a mandrel such that a central portion of the resultant blanket includes both the reinforcing mat and the elastomeric polymer, while a first and second lateral edge of the blanket includes only elastomeric polymer. The resultant blanket is removed from the mandrel and the first and second edges of the blanket are folded radially inwardly so that the edges inhibit the escape of lubricating oil from the extended nip press past the blanket.

20 Claims, 3 Drawing Sheets

METHOD OF MAKING A BEARING BLANKET

BACKGROUND OF THE INVENTION

FIELD OF THE INVENTION

The present invention relates to a method of making a bearing blanket for an extended nip press. More particularly, the present invention relates to a method of making a bearing blanket for an extended nip press having an apple-shaped configuration.

INFORMATION DISCLOSURE STATEMENT

The so-called apple-shaped extended nip press includes a backing roll and an elongate shoe defining a concave surface which cooperates with the backing roll for defining therebetween an extended nip or contact area. A bearing blanket together with a felt and a web to be pressed extend through the extended nip with the web disposed between the bearing blanket and the backing roll for removing water from the web.

Lubricant is applied between the concave surface of the shoe and the bearing blanket in order to facilitate movement of the blanket relative to the shoe.

Normally the blanket follows a generally cylindrical path with a generatrix that is parallel to the cross-machine direction, except where the blanket dips to extend through the extended nip. Consequently, the bearing blanket follows a generally "apple-shaped" cross-sectional configuration.

In view of the application of lubricant between the shoe and the inner surface of the bearing blanket, the escape of lubricant mist from adjacent to the inner surface of the bearing blanket laterally away from the extended nip press and onto ancillary equipment has proved to be a problem.

The aforementioned escape of lubricant in the form of an oil mist has resulted in the buildup of an oil film on ancillary equipment such as access ladders and walkways surrounding the extended nip press. This oil film poses a potential safety hazard to personnel working on or around the extended nip press.

Furthermore, such lubricant mist presents a potential fire hazard. Additionally, there exists a possibility that the lubricating oil will creep around the lateral edges of the bearing blanket to come into contact with the press felt thereby contaminating the resultant pressed web.

In an effort to overcome the aforementioned problems, several proposals have been made in an attempt to contain the lubricant between the shoe and the inner surface of the bearing blanket.

West German patent application No. 3338487 to Escher-Wyss published 2 May 1985 teaches a pair of rotating heads rotatably secured to a stationary frame and a pair of tire-like seals extending from the heads to the inner surface of the bearing blanket in order to define an enclosure within the blanket for the containment of the resultant oil mist.

However, the aforementioned prior art proposals are relatively complex and do not always adequately maintain a seal against the escape of oil mist.

The present invention provides a simple and inexpensive method for producing a bearing blanket for an extended nip press such blanket having flexible extensions at both ends for liquid tight attachment to respective rotatable heads.

Therefore it is a primary object of the present invention to provide a bearing blanket for an extended nip press that overcomes the aforementioned inadequacies of the prior art devices and which makes a considerable contribution to the art of pressing water from a moving web.

SUMMARY OF THE INVENTION

The present invention relates to a method of making a bearing blanket for an extended nip press. The method includes the steps of wrapping a reinforcing mat with uncured elastomeric polymer around a mandrel such that a central portion of the resultant blanket includes both the reinforcing mat and the elastomeric polymer, while a first and second lateral edge of the blanket includes only the elastomeric polymer. The resultant blanket is removed from the mandrel and the first and second edges of the blanket are folded radially inwardly so that the edges inhibit escape of lubricating oil from the extended nip press past the blanket.

In a specific application of the present invention, the elastomeric polymer is a urethane.

In a more specific method according to the present invention, the method includes the further step of curing the elastomeric polymer after the wrapping step and prior to removing the resultant blanket from the mandrel, such that the central portion attains a higher modulus of elasticity than the modulus of elasticity of the edges.

More specifically, the wrapping step includes the substeps of rotating the mandrel and wrapping the reinforcing mat around the rotating mandrel such that the reinforcing mat attains a cross-machine direction width which is equal to the width of the central portion together with the width of the first and the second lateral edges. The wrapping step also includes the substep of applying a release agent circumferentially around the first and the second lateral edges. Also the wrapping step includes the substep of applying the elastomeric polymer around the release agent and the reinforcing mat such that the uncured elastomeric polymer is applied along the cross-machine direction width of the central portion together with the lateral edges.

The method also includes the step of cutting away the reinforcing mat in the vicinity of the first and the second edges of the blanket after the step of removing the blanket from the mandrel and before the folding step such that the resultant blanket includes a central portion having a reinforcing mat covered with cured elastomeric polymer. The blanket also includes lateral edges of cured elastomeric polymer so that the central portion has a higher modulus of elasticity than the modulus of elasticity of the edges thereby permitting folding of the edges of the blanket radially inwardly for inhibiting escape of lubricating oil from the extended nip press past the elastomeric polymer edges.

In one embodiment of the present invention, the reinforcing mat is woven and in another embodiment of the present invention, the reinforcing mat is nonwoven.

In another embodiment of the present invention, there is a two layered construction, the inner layer being woven and the outer layer being non-woven.

Preferably, the reinforcing mat is wound spirally around the mandrel and the release agent is a liquid applied to the outer surface edges of the mat for facilitating the step of cutting away the mat in the vicinity of the edges of the resultant blanket.

In an alternative method according to the present invention, the release agent is a solid tape applied circumferentially around the first and second edges in order to facilitate the step of cutting away the mat in the vicinity of the edges of the resultant blanket.

In a preferred embodiment of the present invention, the polymeric elastomer is urethane and the cured urethane has a hardness within the range 10 to 35 in the Pussey and Jones (P & J) hardness scale.

In one embodiment of the present invention, the step of grinding away circumferentially the cured elastomeric polymer in the vicinity of the edges of the resultant blanket is carried out prior to the step of folding the edges radially inwardly, such grinding away step being subsequent to the cutting away step so that folding of the edges radially inwardly is facilitated.

In another embodiment of the present invention, the step of applying the uncured elastomeric polymer further includes the substeps of applying a thicker coating of uncured elastomeric polymer along the central portion compared with the thickness of the uncured elastomeric polymer applied in the vicinity of the edges so that the step of folding the first and second edges of the blanket radially inwardly is facilitated.

In another embodiment of the present invention, the method includes the step of inflating the resultant blanket after the step of folding the first and second edges of the blanket radially inwardly such that wrinkling of the edges is minimized.

In yet another embodiment of the present invention, the step of applying the uncured elastomeric polymer includes applying elastomeric polymer having a lower modulus of elasticity in the vicinity of the edges compared with the modulus of elasticity of the uncured elastomeric polymer applied along the central portion thereby improving the flexibility of the edges of the blanket.

In one embodiment of the present invention, the step of applying the uncured elastomeric polymer further includes the substeps of applying an initial layer of uncured elastomeric polymer along the entire width of the mat and applying a further coating of uncured elastomeric polymer along the respective edges, the further coating having a coefficient of thermal and/or chemical shrinkage different from the coefficient of thermal and/or chemical shrinkage of the initial layer such that following the cutting step, the resultant elastomeric polymer edges barrel inwardly in order to further inhibit the escape of lubricant past the edges of the resultant blanket.

In still another embodiment of the present invention, the wrapping step is preceded by the step of applying a release agent to the mandrel in the vicinity of the lateral edges of the resultant blanket. Also, the wrapping step includes the substeps of wrapping the reinforcing mat around the mandrel in the vicinity of the central portion and applying the uncured elastomeric polymer circumferentially around the release agent in the vicinity of the edges and around the reinforcing mat along the central portion.

Other methods of carrying out the general concept of the present invention will be readily apparent to those skilled in the art by a consideration of the detailed description contained hereinafter taken in conjunction with the annexed drawings. Such modifications and variations fall within the spirit and scope of the present invention as defined by the appended claims.

DETAILED DESCRIPTION OF THE DRAWINGS

Figure 1:
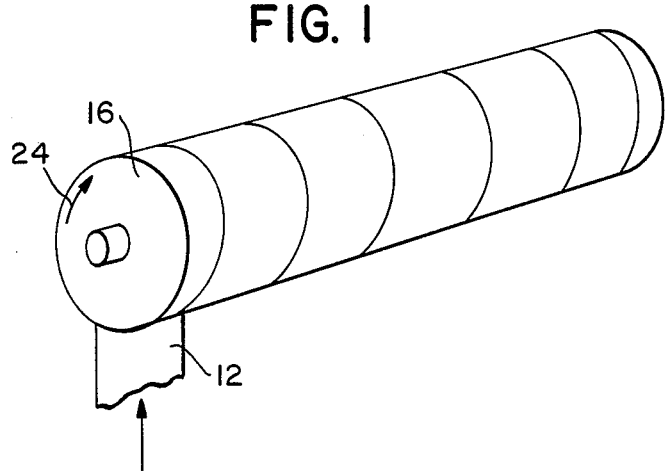
FIG. 1 is a perspective view showing the spiral wrapping of a reinforcing mat around a mandrel.
Figure 2:
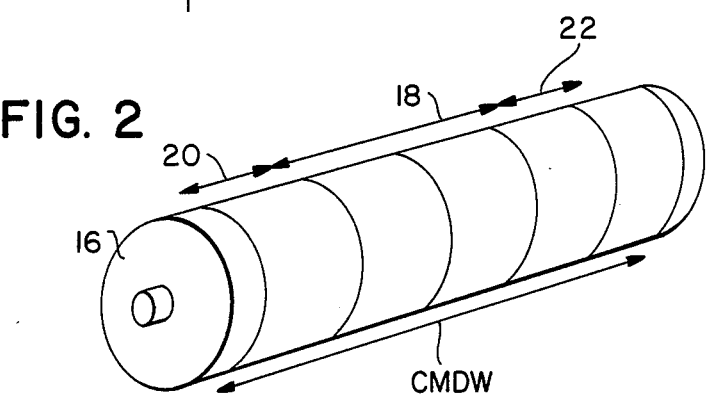
FIG. 2 is a similar view to that shown in FIG. 1 but shows a central portion of the blanket and a first and second lateral edge of the blanket.
Figure 3:
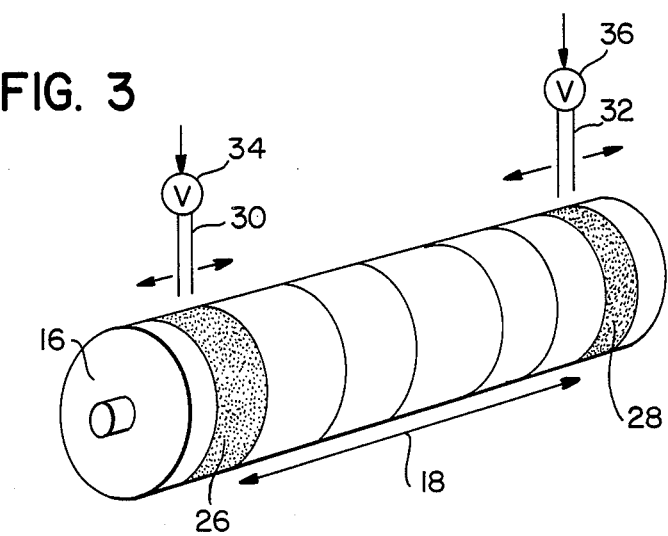
FIG. 3 is a similar view to that shown in FIG. 1 but shows the application of a release agent circumferentially around the first and second lateral edges of the reinforcing mat.
Figure 4:
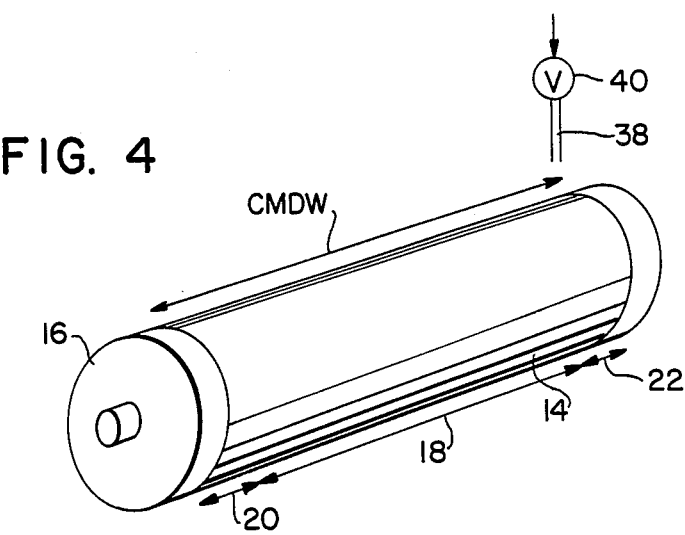
FIG. 4 is a similar view to that shown in FIG. 1 but shows the application of urethane around the release agent and the reinforcing mat such that the uncured urethane is applied along the cross-machine direction width of the central portion together with the lateral edges.
Figure 5:
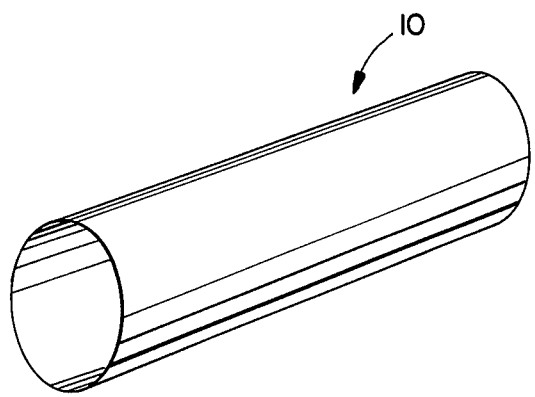
FIG. 5 shows the resultant blanket removed from the mandrel.
Figure 6:
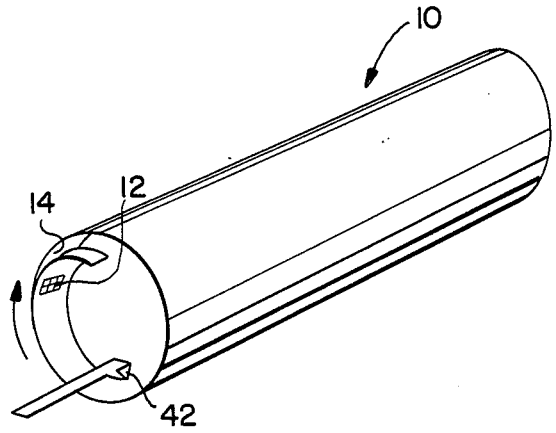
FIG. 6 is a similar view to that shown in FIG. 5 but shows the further step of cutting away the reinforcing mat in the vicinity of the edges of the blanket.

FIGS. 1 to 6 illustrate the various method steps involved in making a bearing blanket generally designated 10 shown in FIGS. 5 and 6 for an extended nip press. The method includes the steps of wrapping a reinforcing mat 12, as shown in FIG. 1, with uncured urethane applied, as shown in FIG. 4, around a mandrel 16. The arrangement is such that a central portion 18, shown in FIG. 2, of the resultant blanket includes both the reinforcing mat 12, as shown in FIG. 2, and the urethane 14, as shown in FIG. 4 while a first and second lateral edge 20 and 22 respectively of the blanket 10 includes only urethane, as shown more particularly in FIG. 6.

The blanket 10 is removed from the mandrel 16 as shown in FIG. 5 and the first and second edges 20 and 22 of the blanket 10 are folded radially inwardly so that the edges 20 and 22 inhibit the escape of lubricating oil from the extended nip press past the blanket.

In a more specific method, the urethane is cured after the wrapping step and prior to removing the resultant blanket 10 from the mandrel 16 such that the central portion 18 attains a higher modulus of elasticity than the modulus of elasticity of the edges 20 and 22 respectively.

More specifically, the wrapping step includes the substeps of rotating the mandrel 16 as indicated by the arrow 24 shown in FIG. 1. The reinforcing mat 12, as shown in FIG. 1, is wrapped around the rotating mandrel 16 such that the reinforcing mat 12 attains a cross-machine direction width CMDW shown in FIGS. 2 and 4 which is equal to the width of the central portion 18 together with the width of the first and second lateral edges 20 and 22 respectively.

As shown in FIG. 3, a release agent 26 and 28 is applied circumferentially around the first and second lateral edges 20 and 22 respectively through supply pipes 30 and 32. The supply of the liquid release agent is controlled by control valves 34 and 36 respectively.

FIG. 4 shows a further supply pipe 38 together with a control valve 40 for metering liquid urethane around the layer of release agent 26 disposed around the first lateral edge 20 and then along the central portion 18 of the reinforcing mat 12 and then along the release agent 28 in the vicinity of the second edge 22 such that the uncured urethane is applied along the cross-machine direction width CMDW of the central portion 18 together with the lateral edges 20 and 22 respectively.

After curing the urethane and removing the resultant blanket 10 as shown in FIG. 5 from the mandrel, the reinforcing mat 12 in the vicinity of the first and second edges 20 and 22 respectively are cut away as shown in FIG. 6.

The cutting away step is shown in more detail in FIGS. 7 to 10 which show an enlarged fragmentary cross-sectional view of the first edge 20 of the blanket 10. A cutting knife 42 disposed internally within the blanket 10 is moved from the position shown in FIG. 7 to the position shown in FIG. 8 such that as the blade 42 moves relative to the blanket 10, a portion 44 of the reinforcing mat 12 in the vicinity of the first edge 20 of the blanket 10 is cut away from the remainder of the reinforcing mat 12.

Figure 7:
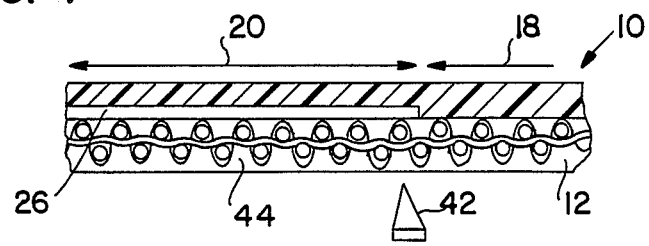
FIG. 7 is an enlarged fragmentary sectional view of the first edge of the blanket prior to the step of cutting away the reinforcing mat.
Figure 8:
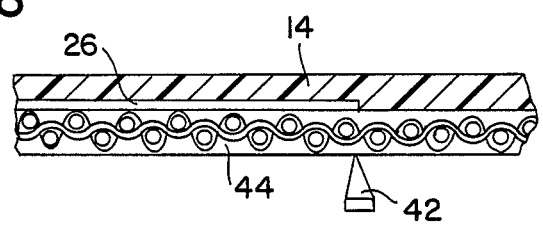
FIG. 8 is a similar view to that shown in FIG. 7 but shows the reinforcing mat being cut away in the vicinity of the first edge of the blanket.
Figure 9:
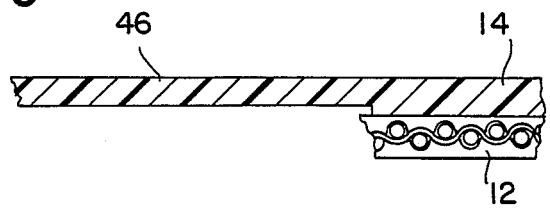
FIG. 9 is a similar view to that shown in FIG. 7 but shows the reinforcing mat having been cut away in the vicinity of the first edge and the release agent having permitted removal of such cut away reinforcing mat in the vicinity of the first edge.

FIG. 9 shows the cut away edge portion 44 of the reinforcing mat 12 as having been removed from the blanket, such removal being facilitated by the layer 26 of release agent shown in FIGS. 7 and 8.

Figure 10:
FIG. 10 is a view which is similar to that shown in FIG. 9 but shows the step of folding the first edge of the blanket radially inwardly so that the edge inhibits the escape of lubricating oil from the extended nip press past the blanket.

With the portion 44 of the reinforcing mat 12 removed, the remaining urethane edge 46 as shown in FIG. 9 is able to be folded radially inwardly as shown in FIG. 10 so that the cured urethane edges inhibit the escape of lubricating oil from the extended nip press past the blanket.

By such a method, the central portion 18 has a higher modulus of elasticity than the modulus of elasticity of the resultant edges 20 and 22 respectively thereby permitting such folding of the edges 20 and 22 of the blanket 10 radially inwardly for inhibiting the aforementioned escape of lubricating oil.

In one embodiment of the present invention as shown in FIGS. 1 to 10, the reinforcing mat 12 is woven.

However, in another embodiment of the present invention, the reinforcing mat is nonwoven.

Additionally, it will be appreciated by those skilled in the art that an inner layer can be woven while an outer layer is non-woven.

As shown in FIGS. 1 to 3, the reinforcing mat 12 is wound spirally around the mandrel 16.

The release agent as shown in FIG. 3 is applied in liquid form to the edges 20 and 22 of the mat 12 in order to facilitate the subsequent step of cutting away the mat in the vicinity of the edges 20 and 22 of the resultant blanket.

However, in an alternative embodiment of the present invention, the release agent is a solid tape which is applied circumferentially around the first and second edges respectively in order to facilitate the step of cutting away the mat in the vicinity of the edges of the resultant blanket.

In a preferred embodiment of the present invention, the cured urethane has a hardness within the range 10 to 35 on the Pussey and Jones (P & J) hardness scale.

In one method according to the present invention, the cured elastomeric polymer in the vicinity of the edges of the resultant blanket are ground away prior to the step of folding the edges radially inwardly, such grinding step being subsequent to the cutting away step so that folding of the edges radially inwardly is facilitated.

In another method according to the present invention, the step of applying the uncured elastomeric polymer further includes the substeps of applying a thicker coating of uncured elastomeric polymer along the central portion compared with the thickness of the uncured elastomeric polymer applied in the vicinity of the respective edges so that the step of folding the first and second edges of the blanket radially inwardly is facilitated.

In yet another method according to the present invention, the blanket is inflated after the step of folding the first and the second edges of the blanket radially inwardly such that wrinkling of the edges is minimized.

In another method according to the present invention, the step of applying the uncured urethane includes applying a urethane having a lower modulus of elasticity in the vicinity of the edges compared with the modulus of elasticity of the uncured urethane applied along the central portion thereby improving the flexibility of the edges of the blanket.

Another method according to the present invention includes in the step of applying the uncured elastomeric polymer the substeps of applying an initial layer of uncured elastomeric polymer along the entire width of the mat and then applying a further coating of uncured elastomeric polymer along the respective edges, the further coating having a coefficient of thermal and/or chemical shrinkage different from the coefficient of thermal and/or chemical shrinkage of the initial layer such that following the cutting step, the resultant elastomeric polymer edges bow inwardly in order to further inhibit the escape of lubricant past the edges of the resultant blanket.

In yet another embodiment of the present invention, the wrapping step is preceded by the step of applying a release agent to the mandrel in the vicinity of the lateral edges of the proposed resultant blanket and then the wrapping step includes the substeps of wrapping the reinforcing mat around the mandrel in the vicinity of the central portion and applying the uncured elastomeric polymer circumferentially around the release agent in the vicinity of the edges and around the reinforcing mat along the central portion.

In each of the aforementioned methods, the resultant blanket includes a central portion having a reinforced mat together with cured elastomeric polymer. The blanket also includes integral edge portions of flexible elastomeric polymer which are folded inwardly for preventing the escape of oil mist lubricant used between the inner surface of the blanket and the extended nip press shoe.

What is claimed is:

1. A method of making a bearing blanket for an extended nip press, said method comprising steps of:
    wrapping a reinforcing mat with uncured elastomeric polymer around a mandrel such that a central portion of the resultant blanket includes both the reinforcing mat and the elastomeric polymer, while a first and second lateral edge of the blanket includes only elastomeric polymer;

curing the elastomeric polymer;

removing the resultant blanket from the mandrel; and folding the first and second edges of the blanket radially inwardly so that the edges inhibit the escape of lubricating oil from the extended nip press past the blanket.

2. A method as set forth in claim 1, wherein the curing step further includes:

curing the elastomeric polymer after the wrapping step and prior to removing the resultant blanket from the mandrel, such that the central portion attains a higher modulus of elasticity than the modulus of elasticity of the edges.

3. A method as set forth in claim 2, wherein the wrapping step includes the substeps of:

rotating the mandrel;

wrapping the reinforcing mat around the rotating mandrel, such that the reinforcing mat attains a cross machine direction width, which is equal to the width of the central portion together with the width of the first and second lateral edges;

applying a release agent circumferentially around the first and second lateral edges;

applying the elastomeric polymer around the release agent and the reinforcing mat such that the uncured elastomeric polymer is applied along the cross machine direction width of the central portion together with the lateral edges;

the method further including the step of:

cutting away the reinforcing mat in the vicinity of the first and second edges of the blanket after the step of removing the blanket from the mandrel, and before the folding step, such that the resultant blanket includes a central portion having a reinforcing mat covered with cured elastomeric polymer, the blanket also having lateral edges of cured elastomeric polymer so that the central portion has a higher modulus of elasticity than the modulus of elasticity of the edges thereby permitting folding of the edges of the blanket radially inwardly for inhibiting escape of lubricating oil from the extended nip press past the urethane edges.

4. A method as set forth in claim 3, wherein the reinforcing mat is woven.

5. A method as set forth in claim 3, wherein the reinforcing mat is nonwoven.

6. A method as set forth in claim 3 wherein the wrapping step includes the substeps of:

wrapping a woven inner layer around the mandrel;

wrapping a non-woven outer layer around the woven inner layer.

7. A method as set forth in claim 3, wherein the reinforcing mat is wound spirally around the mandrel.

8. A method as set forth in claim 3, wherein the release agent is a liquid applied to the edges of the mat for facilitating the step of cutting away the mat in the vicinity of the edges of the resultant blanket.

9. A method as set forth in claim 3, wherein the release agent is a solid tape applied circumferentially around the first and second edges, in order to facilitate the step of cutting away the mat in the vicinity of the edges of the resultant blanket.

10. A method as set forth in claim 3, wherein the cured elastomeric polymer has a hardness within the range 10 to 35 P and J.

11. A method as set forth in claim 3, further including the step of:

grinding away circumferentially the cured elastomeric polymer in the vicinity of the edges of the resultant blanket prior to the step of folding the edges radially inwardly and subsequent to the cutting away step, so that folding of the edges radially inwardly is facilitated.

12. A method as set forth in claim 3, wherein the step of applying the uncured elastomeric polymer further includes the substeps of applying a thicker coating of uncured elastomeric polymer along the central portion compared with the thickness of the uncured elastomeric polymer applied in the vicinity of the edges, so that the step of folding the first and second edges of the blanket radially inwardly is facilitated.

13. A method as set forth in claim 3, further including the step of inflating the resultant blanket after the step of folding the first and second edges of the blanket radially inwardly, such that wrinkling of the edges is minimized.

14. A method as set forth in claim 3, wherein the step of applying the uncured elastomeric polymer includes applying an elastomeric polymer having a lower modulus of elasticity in the vicinity of the edges compared with the modulus of elasticity of the uncured elastomeric polymer applied along the central portion, thereby improving the flexibility of the edges of the blanket.

15. A method as set forth in claim 3, wherein the step of applying the uncured elastomeric polymer further includes the substeps of:

applying an initial layer of uncured elastomeric polymer along the entire width of the mat;

applying a further coating of uncured elastomeric polymer along the respective edges, the further coating having a coefficient of thermal and/or chemical shrinkage different from the coefficient of thermal and/or chemical shrinkage of the initial layer, such that following the cutting step, the resultant elastomeric polymer edges barrel inwardly in order to further inhibit the escape of lubricant past the edges of the resultant blanket.

16. A method as set forth in claim 1, wherein the reinforcing mat is woven.

17. A method as set forth in claim 1, wherein the reinforcing nonwoven.

18. A method as set forth in claim 1 wherein the reinforcing mat includes:

an inner woven layer;

an outer non-woven layer.

19. A method as set forth in claim 1, wherein the wrapping step is preceded by the step of:

applying a release agent to the mandrel in the vicinity of the lateral edges of the resultant blanket;

the wrapping step including the substeps of: wrapping the reinforcing mat around the mandrel in the vicinity of the central portion;

applying the uncured elastomeric polymer circumferentially around the release agent in the vicinity of the edges, and around the reinforcing mat along the central portion.

20. A method as set forth in claim 1 wherein said elastomeric polymer is urethane.

* * * * *